(12) United States Patent
Tamaizumi et al.

(10) Patent No.: US 8,050,824 B2
(45) Date of Patent: Nov. 1, 2011

(54) ELECTRIC POWER STEERING APPARATUS

(75) Inventors: Terutaka Tamaizumi, Okazaki (JP); Hirozumi Eki, Okazaki (JP); Hiroshi Suzuki, Okazaki (JP)

(73) Assignee: JTekt Corporation, Osaka-shi (JP)

( * ) Notice: Subject to any disclaimer, the term of this patent is extended or adjusted under 35 U.S.C. 154(b) by 549 days.

(21) Appl. No.: 12/260,472

(22) Filed: Oct. 29, 2008

(65) Prior Publication Data

US 2009/0112405 A1 Apr. 30, 2009

(30) Foreign Application Priority Data

Oct. 30, 2007 (JP) .................................. 2007-282154

(51) Int. Cl.
*B62D 5/04* (2006.01)
*B62D 119/00* (2006.01)
(52) U.S. Cl. ............................. 701/42; 701/41; 180/443
(58) Field of Classification Search ................... 701/41, 701/42, 43; 180/443, 446
See application file for complete search history.

(56) References Cited

U.S. PATENT DOCUMENTS

| | | | |
|---|---|---|---|
| 6,286,621 B1 | 9/2001 | Mukai et al. | |
| 7,540,351 B2 * | 6/2009 | Kataoka et al. | 180/446 |
| 7,604,088 B2 * | 10/2009 | Nishizaki et al. | 180/446 |
| 7,860,624 B2 * | 12/2010 | Kubota et al. | 701/41 |
| 2005/0103561 A1 | 5/2005 | Endo et al. | |
| 2008/0167780 A1 | 7/2008 | Suzuki et al. | |

FOREIGN PATENT DOCUMENTS

| | | |
|---|---|---|
| EP | 1 800 992 A1 | 6/2007 |
| EP | 1 816 053 A1 | 8/2007 |
| JP | 2002-293256 | 10/2002 |
| JP | 2004-203089 | 7/2004 |
| JP | 2006-131191 | 5/2006 |

OTHER PUBLICATIONS

U.S. Appl. No. 12/273,881, filed Nov. 19, 2008, Tamaizumi.
U.S. Appl. No. 12/354,401, filed Jan. 15, 2009, Nozawa.
U.S. Appl. No. 12/355,118, filed Jan. 16, 2009, Nozawa, et al.
U.S. Appl. No. 12/435,046, filed May 4, 2009, Tamaizumi, et al.

* cited by examiner

*Primary Examiner* — Paul N. Dickson
*Assistant Examiner* — George D. Spisich
(74) *Attorney, Agent, or Firm* — Oblon, Spivak, McClelland, Maier & Neustadt, L.L.P.

(57) ABSTRACT

An assist gradient Ra and also an F/B gain gradient Rp are inputted to an assist gradient compensation control unit. The F/B gradient Rp is added to the assist gradient Ra in an adder and the sum obtained is inputted into a switching control unit. The assist gradient Ra that has been inputted from a basic assist control unit is directly inputted together with the sum to the switching control unit. When a torque feedback control is executed, the switching control unit outputs the sum of the assist gradient Ra and F/B gain gradient Rp to a filter constant computation unit and an assist gradient gain computation unit.

7 Claims, 6 Drawing Sheets

ELECTRIC POWER STEERING APPARATUS

INCORPORATION BY REFERENCE

The disclosure of Japanese Patent Application No. 2007-282154 filed on Oct. 30, 2007 including the specification, drawings and abstract is incorporated herein by reference in its entirety.

BACKGROUND OF THE INVENTION

1. Field of the Invention

This invention relates to an electric power steering (EPS) apparatus.

2. Description of the Related Art

EPS apparatuses using a motor as a drive source have been used as power steering units for vehicles. A variety of suggestions have been made to realize better steering feeling in the EPS by using high controllability thereof.

For example, Japanese Patent Application Publication No. 2006-131191 (JP-A-2006-131191) discloses a configuration in which characteristics of each compensation control are changed based on a ratio (assist gradient) of a variation of a basic assist component to a variation of a steering torque. Thus, the EPS usually executes an operation of providing an assist force corresponding to a steering torque detected based on a torsion angle of a torsion bar provided at the steering shaft, and the variation of the assist gradient is equivalent to the variation of a spring constant of the torsion bar. This configuration makes it possible to realize good steering feeling by optimizing the characteristics of each compensation control according to the variation of such basic steering characteristics.

Further, the EPS features a degree of freedom in layout selection that is higher and an energy consumption amount that is lower than those of hydraulic power steering apparatuses. For this reason, the EPS systems have been finding ever growing application to vehicles with a small load on a front shaft of the vehicle, such as small automobiles and the so-called mid-ship vehicles. However, although such vehicles feature a small motor torque, a problem associated therewith is that a response feeling during steering, that is, a steering reaction force, is often insufficient. Accordingly, a configuration has been disclosed (see, for example, Japanese Patent Application Publication No. 2002-293256 (JP-A-2002-293256)) in which a steering reaction force component in the direction opposite that of the steering operation is superimposed on the basic assist component. Furthermore, better steering feeling can be also realized by introducing a feedback control when the steering reaction force component is computed.

However, a problem arises when the above-described two conventional configurations are used together. Thus, the execution of the torque feedback control changes an apparent spring constant of the torsion bar. As a result, it is impossible to optimize each compensation control by simply combining the two configurations and, therefore, the control stability and steering feeling are degraded.

SUMMARY OF THE INVENTION

The invention was created to resolve the above-described problems, and it is an object of the invention to provide an EPS apparatus that can realize good steering feeling with good stability.

The first aspect of the invention relates to an EPS apparatus including: a steering force assist device that provides an assist force for assisting a steering operation to a steering system by using a motor as a drive source, and a controller that controls an operation of the steering force assist device. The controller computes a fundamental component of the assist force to be generated in the steering force assist device based on a steering torque, and superimposes on the fundamental component a steering reaction force component that is computed by executing a torque feedback control based on a difference between a target steering reaction force and the steering torque, which is an actual steering reaction force. The controller executes a compensation control based on an assist gradient, which is a ratio of a variation of the fundamental component to a variation of the steering torque when the torque feedback control is not executed. The controller executes the compensation control based on a value obtained by adding a feedback gain gradient, which is a ratio of a variation of the steering reaction force component to a variation of the difference in the torque feedback control, to the assist gradient when the torque feedback control is executed.

Thus, the variation amount of an assist force (target assist force) that has to be generated by the steering force assist device when the torque feedback control is executed uses as a base a sum total of the variation amount of the fundamental component and the variation amount of the steering reaction force component, both being based on the steering torque. As a result, a ratio of the variation of the target assist force to the variation of the steering torque $\tau$ assumes a value close to a value obtained by adding up the assist gradient and the feedback gain gradient. Therefore, by executing the assist gradient compensation control by using the sum obtained, as in the above-described configuration, it is possible to optimize each compensation control with high accuracy even during the torque feedback control. As a result, good steering feeling can be realized with good stability.

In the first aspect, the controller may limit the steering reaction force component and does not add the feedback gain gradient to the assist gradient for the compensation control when the steering reaction force component is limited.

Thus, when the steering reaction force component is constant, regardless of the steering torque variations, limiting the steering reaction force component makes it possible to ignore the effect produced by the execution of the torque feedback control on "the apparent spring constant of the torsion bar". Therefore, with this configuration, each compensation control can be optimized with better stability.

In the first aspect, the controller may compute the fundamental component of the assist force based on the steering torque that is detected by a torque sensor and which is subjected to a phase compensation processing, and the steering reaction force component is limited based on a steering torque which the phase compensation processing is not subjected.

Thus, the object of limiting the steering reaction force component is to inhibit an extremely large steering reaction force in each instant, but the phase of the steering torque after the phase compensation processing is shifted from that of the steering torque serving as a detection signal outputted by the torque sensor. In other words, the instant for which the correction is truly necessary is not captured accurately. However, by using a steering torque prior to phase compensation, which is a detection signal outputted by the torque sensor, as in the above-described aspect, it is possible to capture accurately the instant for which the correction is truly necessary and to execute the limitation of the steering reaction force component with higher accuracy.

With the above-described aspect of the invention, it is possible to provide an EPS apparatus that can realize good steering feeling with good stability.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
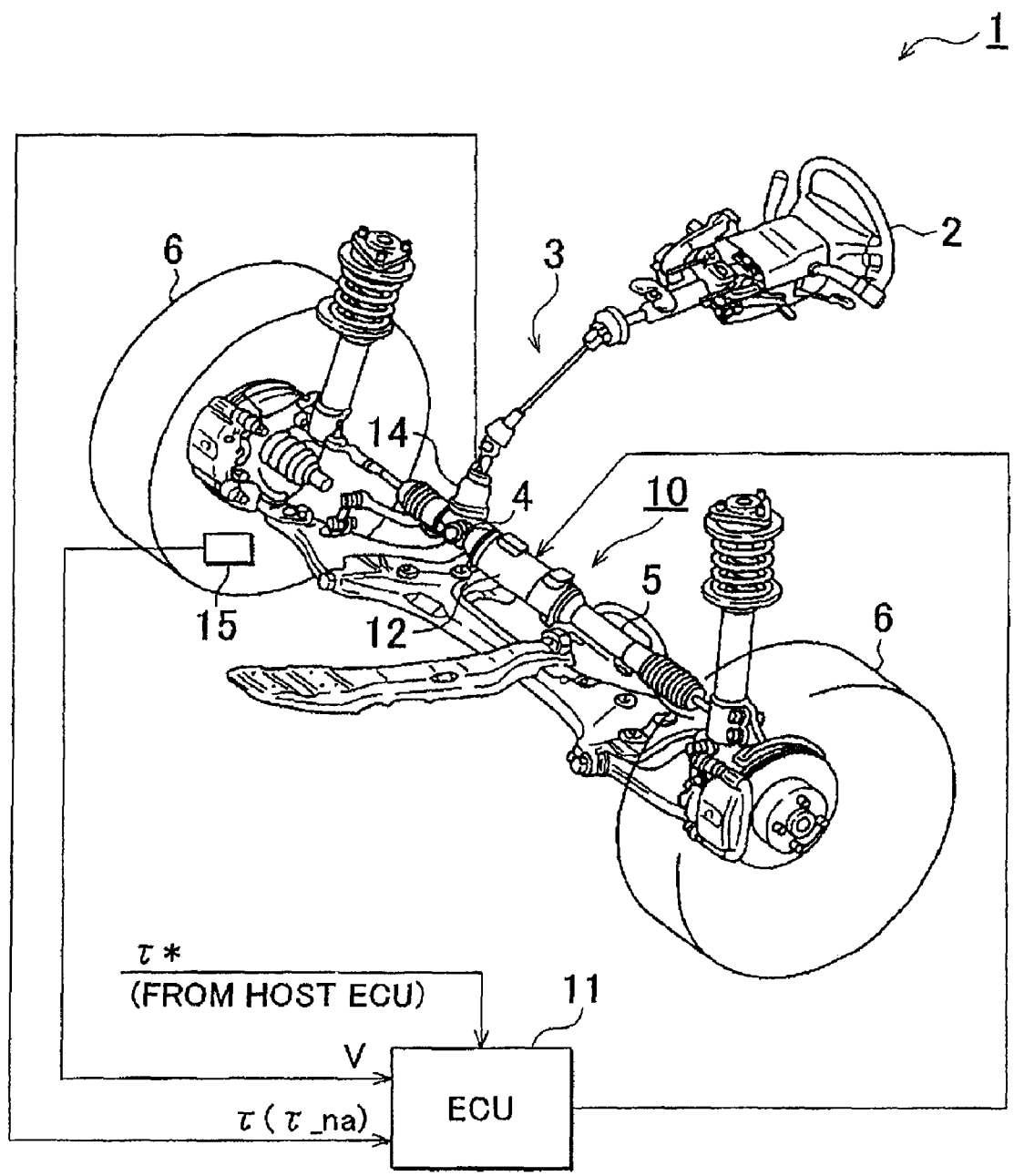
FIG. 1 shows a schematic configuration of an EPS apparatus.

An embodiment of the invention will be explained below with reference to the appended drawings. FIG. 1 is a schematic diagram of an EPS 1 of the present embodiment. As shown in the figure, a steering shaft 3 having a steering wheel (steering) 2 fixed thereto is linked to a rack 5 via a rack-and-pinion mechanism 4, and the rotation of the steering shaft 3 following the steering operation is converted by the rack-and-pinion mechanism 4 into the reciprocal linear movement of the rack 5. The reciprocal linear movement of the rack 5 changes the steering angle of the drive wheels 6.

The EPS 1 includes an EPS actuator 10 as a steering force assist device that provides an assist force for assisting the steering operation to a steering system and an ECU 11 serving as a controller for controlling the operation of the EPS actuator 10.

The EPS actuator 10 of the present embodiment is an EPS actuator of the so-called rack type in which a motor 12, which is a drive source, is disposed coaxially with the rack 5. The assist torque generated by the motor 12 is transmitted to the rack 5 via a ball screw mechanism (not shown in the figure). The motor 12 of the present embodiment is a brushless motor that revolves by receiving a three-phase (U, V, W) drive power supply from the ECU 11. The ECU 11 serving as a motor control device controls the assist force provided to the steering system by controlling the assist torque generated by the motor 12 (power assist control).

In the present embodiment, a torque sensor 14 and a vehicle speed sensor 15 are connected to the ECU 11. In the present embodiment, a torque sensor of the so-called twin-resolver type that detects a torsion angle of a torsion bar provided in the intermediate section of the steering shaft 3 by a pair of angle sensors (resolvers) is employed as the torque sensor 14. Further, the ECU 11 executes the actuation of an EPS actuator 10, that is, power assist control based on a steering torque τ (τ_na) and vehicle speed V detected by the torque sensor 14 and vehicle speed sensor 15, respectively.

Figure 2:
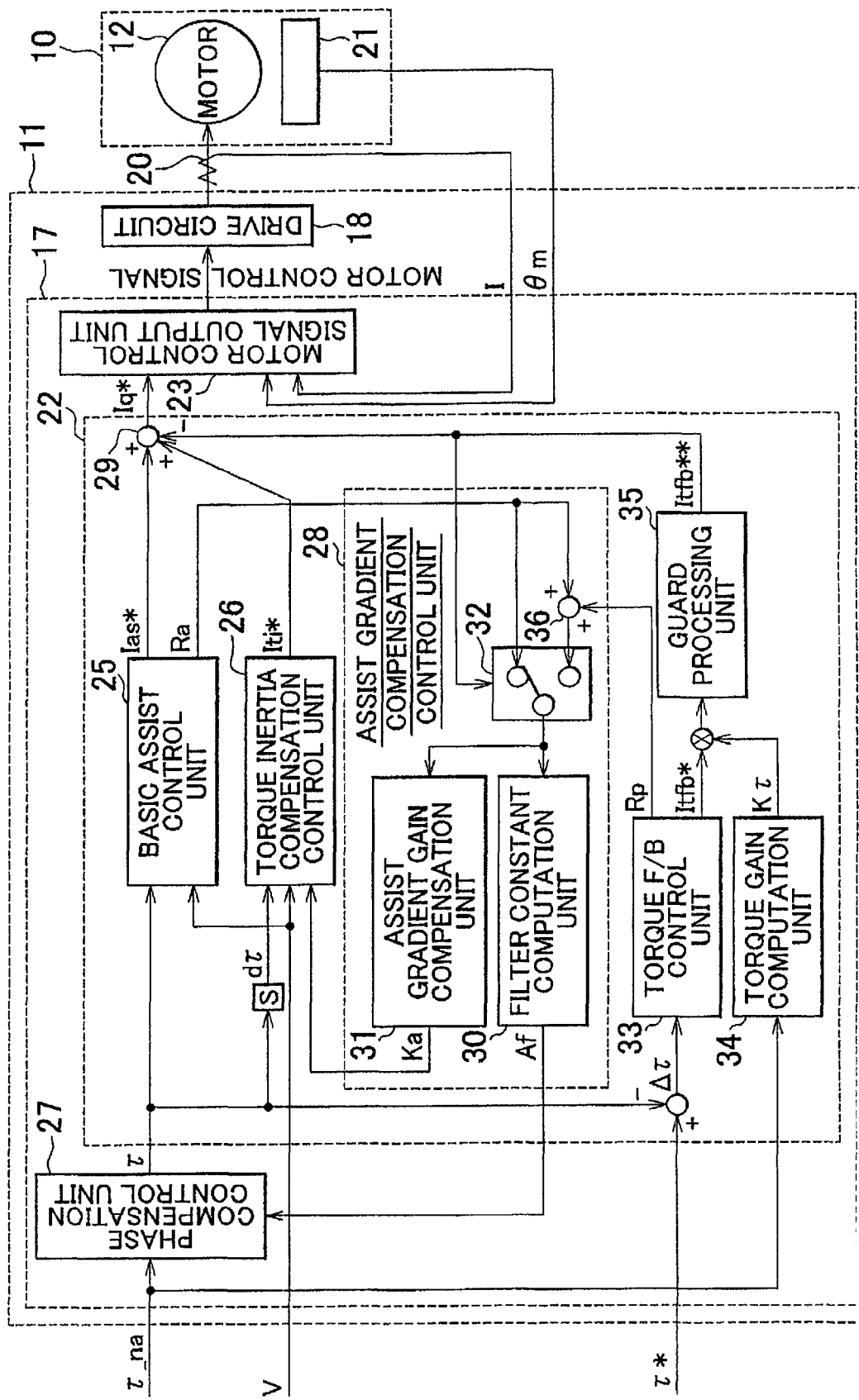
FIG. 2 is a control block diagram of the EPS in the present embodiment.

An electric configuration of the EPS of the present embodiment will be described below. FIG. 2 is a control block diagram of the EPS of the present embodiment. As shown in the figure, the ECU 11 includes a microcomputer 17 serving as a motor control signal output means for outputting a motor control signal and a drive circuit 18 that supplies a three-phase drive power to the motor 12 based on the motor control signal.

In the present embodiment, a current sensor 20 for detecting an actual current value I supplied to the motor 12 and a revolution angle sensor 21 for detecting a motor revolution angle θm of the motor 12 are connected to the ECU 11. The microcomputer 17 generates a motor control signal that is outputted to a drive circuit 18 based on the vehicle state parameters and also the actual current value I and motor revolution angle θm detected based on the output signals of the current sensor 20 and revolution angle sensor 21.

More specifically, the microcomputer 17 includes a current command value computation unit 22 that computes a target value of the assist force provided to the steering system, that is, a current command value Iq* corresponding to the target assist force, and a motor control signal output unit 23 that outputs a motor control signal based on the current command value Iq* computed by the current command value computation unit 22.

The current command value Iq* outputted by the current command value computation unit 22 is inputted, together with the actual current value I detected by the current sensor 20 and the motor revolution angle θm detected by the revolution angle sensor 21 to the motor control signal output unit 23. The motor control signal output unit 23 computes a motor control signal by executing the feedback control designed to cause the actual current value I to follow the current command value Iq* corresponding to the target assist force.

More specifically, in the present embodiment, a brushless motor that revolves when a three-phase (U, V, W) drive power is supplied thereto is used as the motor 12. The motor control signal output unit 23 performs the current feedback control by converting the phase current values (Iu, Iv, Iw) of the motor 12 detected as the actual current value I into the d-, q-axis current values (d/q conversion) of the d/q coordinate system.

Thus, the current command value Iq* is inputted as a q-axis current command value into the motor control signal output unit 23, and the motor control signal output unit 23 performs the d/q conversion of the phase current values (Iu, Iv, Iw) based on the motor revolution angle θm detected by the revolution angle sensor 21. Furthermore, the motor control signal output unit 23 also computes the d-, q-axis voltage command values based on the d-, q-axis current values and q-axis current command value. Phase voltage command values (Vu*, Vv*, Vw*) are then computed by d/q reverse conversion of the d-, q-axis voltage command values, and a motor control signal is generated based on the phase voltage command values.

The ECU 11 of the present embodiment is configured so that the motor control signal generated in the above-described manner is outputted by the microcomputer 17 to the drive circuit 18, and the drive circuit 18 supplies a three-phase drive power based on this motor control signal to the motor 12, thereby controlling the operation of the EPS actuator 10.

The computation of the current command value with the current command value computation unit 22 will be described below in greater detail. The current command value computation unit 22 of the present embodiment includes a basic assist control unit 25 that computes a basic assist control value Ias*, which is a fundamental component of the assist force that has to be generated by the EPS actuator 10, and a torque inertia compensation control unit 26 that computes a torque inertia compensation amount Iti* based on a differential value (steering torque differential value dτ) of the steering torque τ.

In the present embodiment, first, the steering torque τ_na serving as a detection signal outputted by the torque sensor 14 is inputted into a phase compensation control unit 27. Then, the steering torque τ after the implementation of the phase compensation processing in the phase compensation control unit 27 and vehicle speed V are inputted to the basic assist control unit 25.

Figure 3:
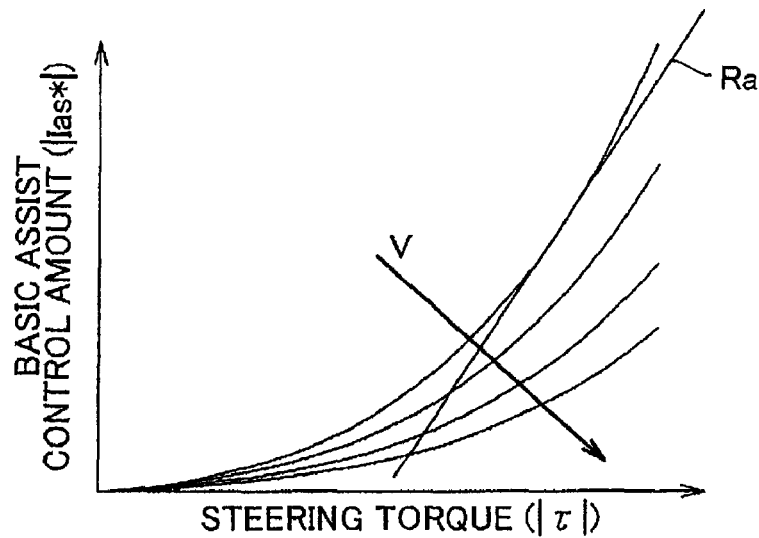
FIG. 3 is an explanatory drawing illustrating the main features of the basic assist control computation and assist gradient.

As shown in FIG. 3, the basic assist control unit 25 computes the basic assist control value Ias* having an absolute value that increases with the increase in the absolute value of the steering torque τ and with the decrease in the vehicle speed V. Further, the design is such that in the relation with the steering torque τ, an assist gradient Ra, which is a ratio of the variation of the basic assist control value Ias* to the variation of the steering torque τ, increases with the increase in the steering torque τ.

On the other hand, the vehicle speed V is inputted, in addition to the steering torque differential value dτ, into the torque inertia compensation control unit 26 of the present embodiment. The torque inertia compensation control unit 26 then executes the torque inertia compensation control based on these state parameters. The "torque inertia compensation control" is a control that is performed to compensate the effect of EPS inertia, that is, a control serving to inhibit "a resistance feel (tracking delay)" at the "start of disconnection" and "a flow feel (overshoot)" at the "end of disconnection" in the steering operation. Such torque inertia compensation control is also effective in inhibiting the vibrations generated in the steering system by the application of a reverse input stress to the drive wheels 6.

Figure 4:
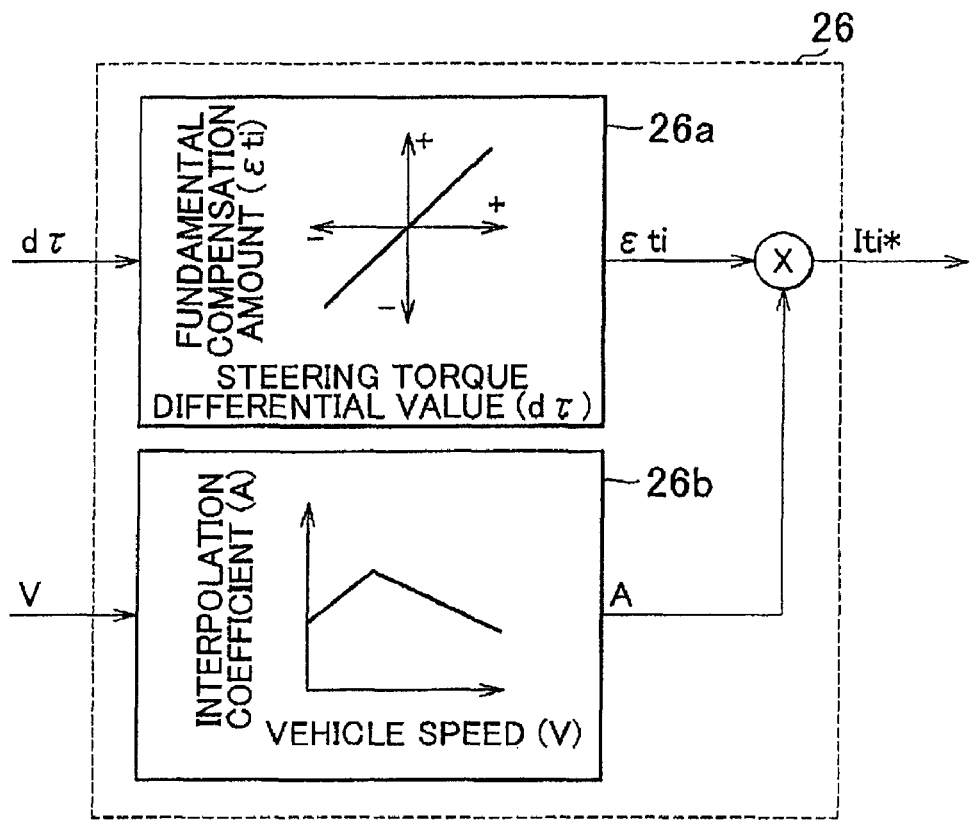
FIG. 4 is a control block diagram of the torque inertia compensation control unit.

More specifically, as shown in FIG. 4, the torque inertia compensation control unit 26 includes a map 26a in which the steering torque differential value dτ is associated with a fundamental compensation amount εti, and a map 26b in which the vehicle speed V is associated with an interpolation coefficient A. In the map 26a, the fundamental compensation amount εti is set to assume a value that further increases the basic assist control value Ias* (absolute value thereof) computed in the basic assist control unit 25 with the increase in the absolute value of the inputted steering torque differential value dτ. Further, in the map 26b, the interpolation coefficient A is set to assume a value that increases with the increase in the vehicle speed V in a low-speed region and decrease with the increase in vehicle speed in a high-speed region. Further, the torque inertia compensation control unit 26 computes the torque inertia compensation amount Iti* by multiplying the fundamental inertia amount εti and the interpolation coefficient A found with reference to these maps 26a, 26b.

Further, the microcomputer 17 changes the characteristics of each compensation control based on the assist gradient Ra whose value changes correspondingly to the steering torque τ detected in the above-described manner.

More specifically, an assist gradient compensation control unit 28 is provided in the current command value computation unit 22 of the present embodiment, and the assist gradient Ra inputted from the basic assist control unit 25 into the assist gradient compensation control unit 28 is inputted via the below-described switching control unit 32 into a filter constant computation unit 30 and an assist gradient gain computation unit 31. Further, in the present embodiment, a filter constant Af computed in the filter constant computation unit 30 is outputted to the phase compensation control unit 27, and an assist gradient gain Ka computed in the assist gradient computation unit 31 is outputted to the torque inertia compensation control unit 26, thereby changing the characteristics of the phase compensation control and torque inertia compensation control.

Figure 5:
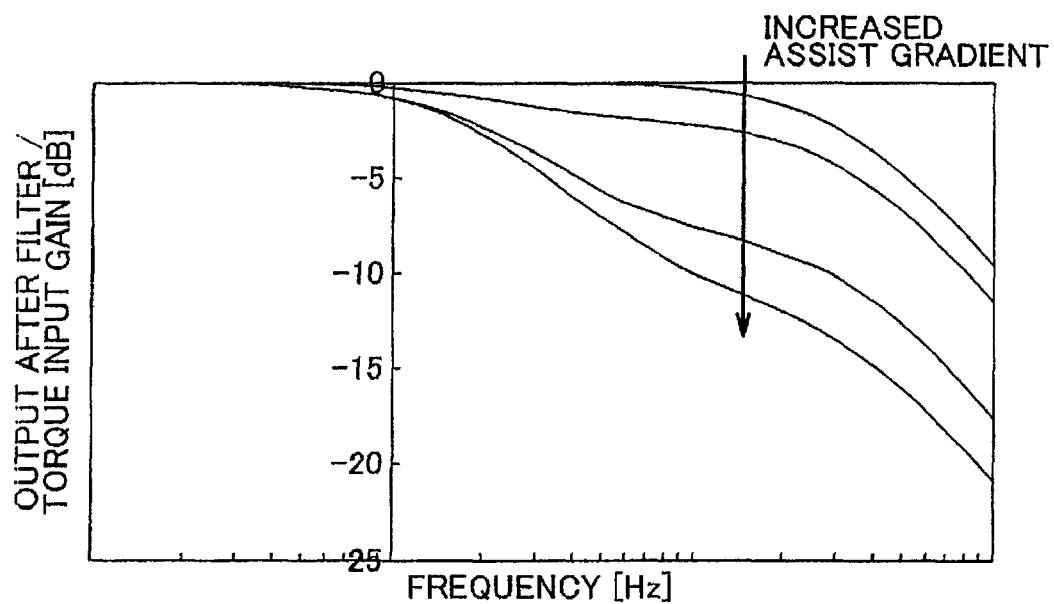
FIG. 5 is an explanatory drawing illustrating the mode of assist gradient compensation control with respect to the phase compensation processing.

Thus, as described hereinabove, the variation of the assist gradient Ra is equivalent to the variation of the spring constant of the torsion bar provided in the intermediate portion of the steering shaft 3. Therefore, the vibrations tend to occur easier when the assist gradient Ra increases, but the problem of vibrations increasing with the increase in the assist gradient Ra can be resolved by inhibiting the variations in the characteristics of the phase compensation control, more specifically by inhibiting the gain of filter characteristics in the phase compensation processing. Further, the increase in vibrations accompanying the increase in assist gradient Ra is inhibited by outputting the filter constant Af such that decreases the gain of filter characteristic in response to increase in the assist gradient Ra such as shown in FIG. 5, from the assist gradient compensation control unit 28 to the phase compensation control unit 27.

Figure 6:
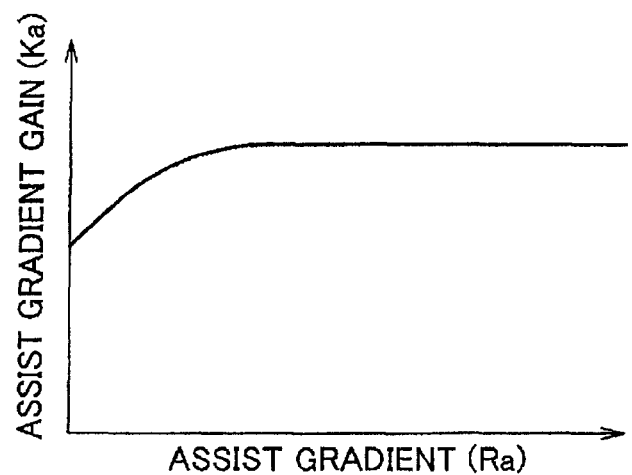
FIG. 6 is an explanatory drawing illustrating the relationship between the assist gradient and assist gradient gain.

Furthermore, although inhibiting the vibrations occurring in the steering system under the application of reverse input stress is effective in the torque inertia compensation control based on the steering torque differential value dτ, the excessive rise of the assist torque can degrade the steering feeling (the so-called "pull feeling" at the start of disconnection) or cause instability (oscillations) in control. With regard to this issue, in the present embodiment, in a region with a small assist gradient Ra in which it is hardly necessary to raise the assist torque abruptly, this region being shown in FIG. 6, an assist gradient gain Ka reducing the torque inertia compensation amount Iti* is outputted from the assist gradient compensation control unit 28 to the torque inertia compensation control unit 26. With such a configuration, good steering feeling can be realized as the characteristics of the phase compensation control are changed.

As shown in FIG. 2, the basic assist control amount Ias* computed in the basic assist control unit 25 and the torque inertia compensation amount Iti* computed in the torque inertia compensation control unit 26 are inputted into an adder 29. The current command value computation unit 22 outputs a value obtained by the addition in the adder 29 as a current command value Iq* to the motor control signal output unit 23.

The current command value computation unit 22 includes a torque F/B control unit 33 in addition to the above-described control units. A torque F/B control amount Iftb* (Iftb) serving as a steering reaction force component for adding a reaction force torque in the direction (return direction) opposite that of the steering angle to the steering 2 computed in the torque F/B control unit 33 is inputted into the adder 29. In the present embodiment, a value obtained by superimposing the torque F/B control amount Iftb on the basic assist control amount Ias* (and torque inertia compensation amount Iti*) is outputted as the current command value Iq* to the motor control signal output unit 23.

More specifically, a steering torque target value τ* serving as a target steering resistant force is inputted from a host ECU (not shown in the figure) to the ECU 11 (see FIG. 1), and a difference Δτ between the steering torque target value τ* serving as a target steering resistance force and the steering torque τ serving as an actual steering reaction force is inputted to the torque F/B control unit 33. The torque F/B control unit 33 computes the torque F/B control amount Iftb* by executing the torque feedback control based on this difference Δτ, more specifically, by multiplying the difference Δτ by a predetermined feedback gain.

Further, the current command value computation unit 22 limits the torque F/B control amount Iftb* inputted to the adder 29 so as to prevent the application of an excessively high steering reaction force and the occurrence of the so-called self-steer.

Figure 7:
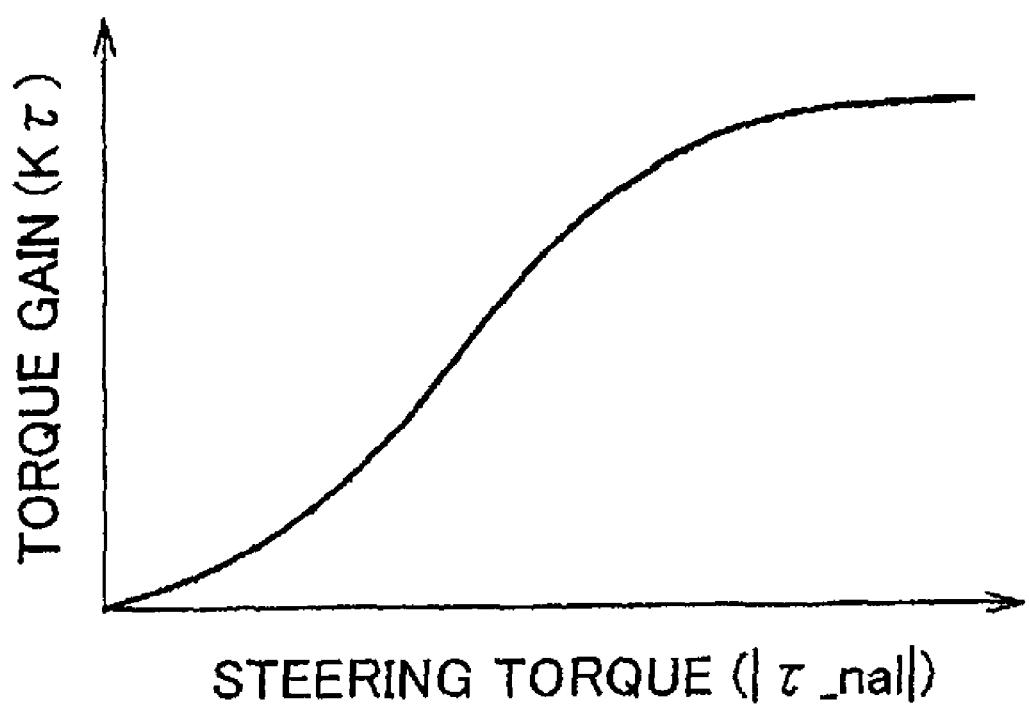
FIG. 7 is an explanatory drawing illustrating the relationship between a steering torque and a steering torque gain.

More specifically, as shown in FIG. 2, the current command value computation unit 22 is provided with a torque gain computation unit 34, and the torque gain computation unit 34 computes the torque gain Kτ for reducing the torque F/B control amount Iftb* correspondingly to the steering torque inputted to the steering 2 (see FIG. 7). A steering torque before the phase compensation process is performed in the phase compensation control unit 27, that is, the steering torque τ_na serving as a detection signal outputted by the torque sensor 14, is inputted to the torque gain computation unit 34. Further, the torque F/B control amount Iftb* outputted by the torque F/B control unit 33 is multiplied by the torque gain Kτ computed by the torque gain computation unit 34.

The current command value computation unit 22 includes a guard processing unit 35, and the torque F/B control amount Iftb* outputted from the torque F/B control unit 33 is inputted to the guard processing unit 35 after being multiplied by the torque gain Kτ as described hereinabove. The torque F/B control amount Iftb** that has been confined to a predetermined range by the guard processing in the guard processing unit 35 is inputted to the adder 29.

(Characteristic Change Processing of Each Compensation Control During Execution of Torque Feedback Control) The mode of characteristic change processing of each compensation control during execution of torque feedback control will be described below.

As described above, the execution of the torque feedback control also changes the apparent spring constant of the torsion bar. As a result, when the torque feedback control is executed, the optimization of each compensation control can be impossible even if the assist gradient compensation control identical to that of the usual mode is executed.

With regard to this issue, in the present embodiment, the attention is paid to the ratio of the steering reaction force component (torque F/B control amount Iftb**) to a variation of the steering reaction force difference (Δτ) in the torque feedback control, that is, to the feedback gain gradient (F/B gain gradient Rp). Further, when the characteristic change control of each compensation control is executed in the assist gradient compensation control unit 28, the optimization of each compensation control is performed by using a value obtained by adding the F/B gain gradient Rp to the assist gradient Ra.

Thus, the variation amount of the current command value Iq* outputted by the current command value computation unit 22 when the torque feedback control is executed uses as a base a sum total of the variation amount of the basic assist control amount Ias* and the variation amount of the torque F/B control amount Iftb**, both being based on the steering torque τ. Therefore, a ratio of the variation of the current command value Iq* to the variation of the steering torque τ inputted to the current command value computation unit 22 approaches the sum of the assist gradient Ra and the F/B gain gradient Rp, and by executing the assist gradient compensation control by using the sum (Ra+Rp) obtained, it is possible to optimize each compensation control with high accuracy.

More specifically, as shown in FIG. 2, the assist gradient Ra is inputted from the basic assist control unit 25 to the assist gradient compensation control unit 28, and the F/G gain gradient Rp is also inputted from the torque F/B control unit 33 to the assist gradient compensation control unit 28. In the present embodiment, the feedback gain used for the torque feedback control in the torque F/B control unit 33 is a predetermined value. Therefore, the F/B gain gradient Rp is also a constant value.

The F/B gain gradient Rp inputted to the assist gradient compensation control unit 28 is added to the assist gradient Ra in the adder 36, and the sum obtained is inputted to the switching control unit 32. The assist gradient Ra that has been inputted from the basic assist control unit 25 is directly inputted together with the sum (Ra+Rp) to the switching control unit 32. When a torque feedback control is executed, the switching control unit 32 outputs the sum (Ra+Rp) of the assist gradient Ra and F/B gain gradient Rp, instead of the assist gradient Ra, to the filter constant computation unit 30 and assist gradient gain computation unit 31.

More specifically, the torque F/B control amount Iftb after the guard treatment in the guard treatment unit 35 is inputted to the switching control unit 32, and the switching control unit 32 executes the output switching based on the inputted torque F/B control amount Iftb.

Figure 8:
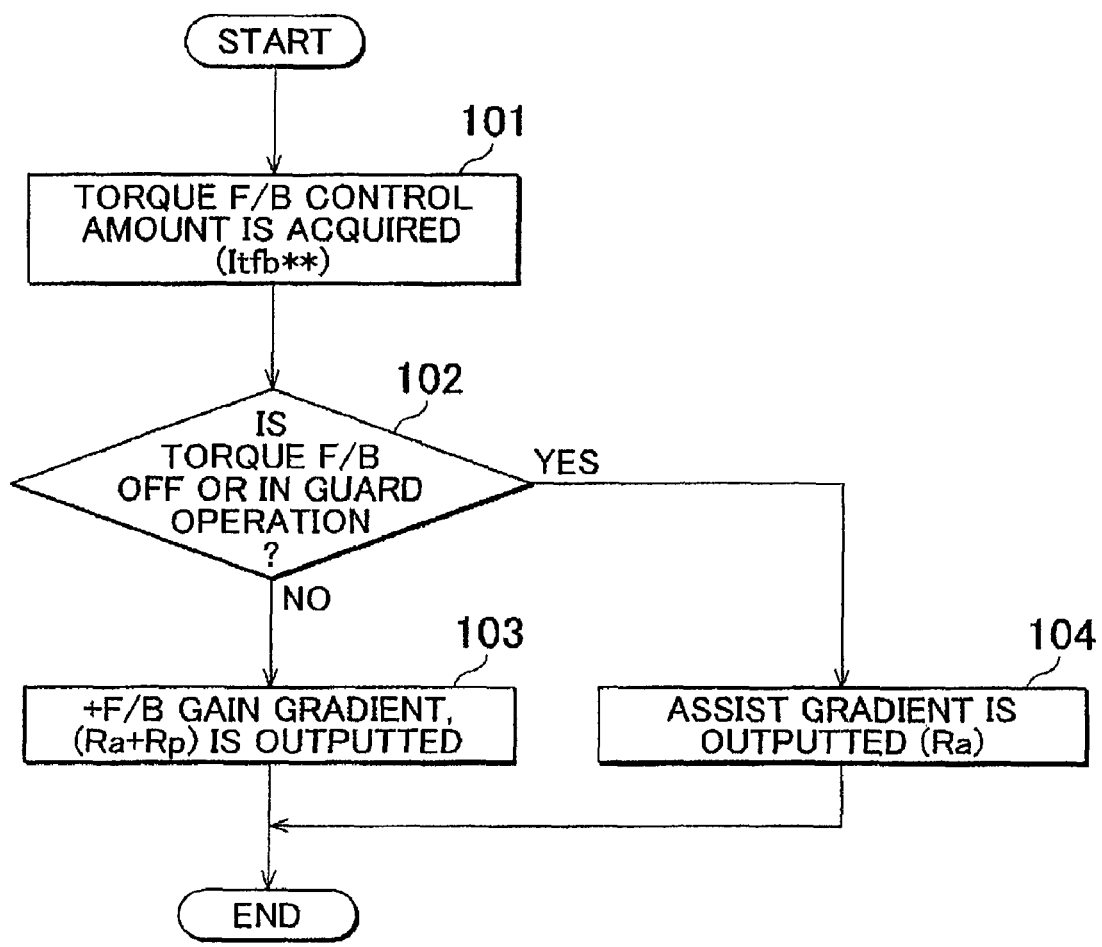
FIG. 8 is a flowchart illustrating the processing sequence of output switching performed in the switching control unit.

Thus, as shown in the flowchart in FIG. 8, when the switching control unit 32 acquires the torque F/B control amount Iftb (step 101), the switching control unit determines based on the torque F/B control amount Iftb whether the torque feedback control is OFF or whether the guard operation is implemented (step 102). When it is determined that "the guard operation is implemented", the guard treatment yields a state in which the outputted torque F/B control amount Iftb is an upper-limit or lower-limit constant value. Further, when the torque F/B control amount Iftb is almost zero, it is determined that "the torque feedback control is OFF". When the torque feedback control is not executed and the guard operation is not implemented (step 102: NO), the switching control unit 32 outputs a sum (Ra+Rp) of the assist gradient Ra and the F/B gain gradient Rp (step 103), and when any of the conditions is met (step 102: YES), the switching control unit 32 outputs the assist gradient Ra (step 104).

The filter constant computation unit 30 and assist gradient gain computation unit 31 execute the computation of the filter constant Af and the computation of the assist gradient gain Ka, respectively, based on the assist gradient Ra or sum (Ra+Rp) outputted by the switching control unit 32, thereby ensuring the optimization of each compensation control, regardless of whether or not the torque feedback control is executed.

The following effects can be obtained in the present embodiment.

(1) The assist gradient Ra is inputted to the assist gradient compensation control unit 28, and the F/B gain gradient Rp is also inputted thereto. The F/B gain gradient Rp is added to the assist gradient Ra in the adder 36 and the sum obtained is inputted to the switching control unit 32. The assist gradient Ra that has been inputted from the basic assist control unit 25 is directly inputted together with the sum (Ra+Rp) to the switching control unit 32. When a torque feedback control is executed, the switching control unit 32 outputs the sum (Ra+Rp) of the assist gradient Ra and F/B gain gradient Rp to the filter constant computation unit 30 and assist gradient gain computation unit 31.

Thus, the variation amount of the current command value Iq* outputted by the current command value computation unit 22 when the torque feedback control is executed uses as a base a sum total of the variation amount of the basic assist control amount Ias* and the variation amount of the torque F/B control amount Iftb**, both being based on the steering torque τ. Therefore, a ratio of the variation of the current command value Iq* to the variation of the steering torque τ inputted to the current command value computation unit 22 approaches the sum of the assist gradient Ra and the F/B gain gradient Rp. Therefore, with the above-described configuration, by executing the assist gradient compensation control by using the sum (Ra+Rp), it is possible to optimize each compensation control with high accuracy even during the torque feedback control. As a result, good steering feeling can be realized with good stability.

The current command value computation unit 22 includes the guard processing unit 35, and the torque F/B control amount Iftb* outputted from the torque F/B control unit 33 is confined to a predetermined range by the guard processing in the guard processing unit 35. Further, the torque F/B control amount Iftb after the guard processing has been implemented in the guard processing unit 35 is inputted to the switching control unit 32. Based on the torque F/B control amount Iftb, the switching control unit determines whether the torque feedback control is OFF or whether the guard operation is implemented. If any of these conditions is met, the assist gradient Ra is directly outputted without the addition of the F/B gain gradient Rp.

Thus, when the torque feedback control is off, or when the outputted torque F/B control amount Iftb** is constant, regardless of the variations in the steering torque τ, due to the guard operation, the effect of the above-described execution of torque feedback control on the "apparent spring constant of the torsion bar" can be ignored. Therefore, with such configuration, more stable optimization of each compensation control can be implemented.

(3) The current control value computation unit 22 includes the torque gain computation unit 34, and the torque gain computation unit 34 computes the torque gain Kτ for reducing the torque F/B control amount Iftb* correspondingly to the steering torque inputted to the steering 2. The computation of the torque gain Kτ in the torque gain computation unit 34 is executed based on the steering torque before the phase compensation process is performed in the phase compensation control unit 27, that is, the steering torque τ_na serving as a detection signal outputted by the torque sensor 14.

Thus, the object of computing the torque gain Kτ is to inhibit an extremely large steering reaction force in each instant, but the phase of the steering torque τ after the phase compensation processing is shifted from that of the steering torque τ_na serving as a detection signal outputted by the torque sensor 14. In other words, the instant for which the correction is truly necessary is not captured accurately. However, with the above-described configuration, by performing computations by using the steering torque τ_na serving as a detection signal outputted by the torque sensor 14, it is possible to capture accurately the instant for which the correction is truly necessary and to execute the torque gain computations with higher accuracy.

The present embodiment may be modified in the manner as follows. In the present embodiment, it is determined whether the torque feedback control is OFF or whether the guard operation is implemented, and when any of these conditions is met, the assist gain compensation control is implemented based directly on the assist gradient Ra, without adding the F/B gain gradient Rp. However, such a configuration is not limiting. For example, it is possible only to determine whether the guard operation is implemented, without determining whether the torque feedback control is OFF. Alternatively, a configuration in which none of these two conditional determination operations is performed may be employed.

In the present embodiment, the assist gradient compensation control with respect to the phase compensation processing executed by the phase compensation control unit 27 is performed by reducing the gain of the filter characteristic in the phase compensation processing as the assist gradient Ra rises. However, such a configuration is not limiting, and a configuration may be employed in which the filter characteristic is changed from the standpoint of the phase advance/delay.

In the present embodiment, the assist gradient compensation control is performed with respect to the phase compensation control relating to the steering torque and the torque inertia compensation control based on the steering torque differential value dτ, as compensation control operations, but the assist gradient compensation control may be performed with respect to another compensation control, for example, a steering return control based on a steering angle (motor revolution angle).

The technical idea and the effect thereof that can be grasped based on the above-described embodiments are described below.

(a) In the EPS apparatus, the controller computes the fundamental component of the assist force based on the steering torque after the output signal of the torque sensor has been subjected to a phase compensation processing and changes the filter characteristic in the phase compensation processing based on the assist gradient.

(b) In the EPS apparatus, the controller superimposes the compensation component that is based on the differential value of the steering torque on the fundamental component and changes the computation characteristic of the compensation component that is based on the differential value of the steering torque on the basis of the assist gradient.

Applications to the apparatus having the above-described features can result in even more remarkable effects.

The invention claimed is:

1. An electric power steering apparatus, comprising:
   a steering force assist device that provides an assist force for assisting a steering operation to a steering system by using a motor as a drive source, and
   a controller that controls an operation of the steering force assist device, wherein
   the controller computes a fundamental component of the assist force to be generated in the steering force assist device based on a steering torque; and
   superimposes on the fundamental component a steering reaction force component that is computed by executing a torque feedback control based on a difference between a target steering reaction force and the steering torque, which is an actual steering reaction force; and
   the controller executes a compensation control of the fundamental component of the assist force, wherein the controller executes the compensation control based on an assist gradient, which is a ratio of a variation of the fundamental component to a variation of the steering torque, when the torque feedback control is not executed, and executes the compensation control based on a value obtained by adding a feedback gain gradient, which is a ratio of a variation of the steering reaction force component to a variation of the difference in the torque feedback control, to the assist gradient when the torque feedback control is executed.

2. The electric power steering apparatus according to claim 1, wherein
   the controller limits the steering reaction force component and executes the compensation control based on the assist gradient, regardless of the feedback gain gradient, when the steering reaction force component is limited.

3. The electric power steering apparatus according to claim 2, wherein
the controller computes the fundamental component of the assist force based on the steering torque which is detected by a torque sensor and to which a phase compensation processing is subjected; and
the steering reaction force component is limited based on the steering torque which is detected by the torque sensor and to which the phase compensation processing is not subjected.

4. The electric power steering apparatus according to claim 1, wherein
the controller determines the execution of the torque feedback based on the steering reaction force component.

5. The electric power steering apparatus according to claim 1, wherein
the compensation control includes at least a phase compensation control of an output signal of a torque sensor;
the controller sets a gain of a filter characteristic used in the phase compensation control based on the assist gradient, regardless of the feedback gain gradient, when the torque feedback control is not executed, and sets the gain of the filter characteristic based on a value obtained by adding the feedback gain gradient to the assist gradient when the torque feedback control is executed.

6. The electric power steering apparatus according to claim 1, wherein
the compensation control includes at least a torque inertia compensation control that compensates the fundamental component of the assist force correspondingly to a differential value of the steering torque;
the controller executes the torque inertia compensation control based on the assist gradient, regardless of the feedback gain gradient, when the torque feedback control is not executed; and executes the torque inertia compensation control based on a value obtained by adding the feedback gain gradient to the assist gradient when the torque feedback control is executed.

7. An electric power steering apparatus, comprising:
a steering force assist device that provides an assist force for assisting a steering operation to a steering system by using a motor as a drive source, and
a controller that controls an operation of the steering force assist device, wherein
the controller computes a fundamental component of the assist force that has to be generated in the steering force assist device based on a steering torque and superimposes on the fundamental component a steering reaction force component that is computed by executing a torque feedback control based on a difference between a target steering reaction force and the steering torque, which is an actual steering reaction force; and
the controller executes a compensation control of the fundamental component of the assist force, and changes a parameter used in the compensation control correspondingly to execution/non-execution of a torque feedback control;
an assist gradient, which is a ratio of a variation of the fundamental component to a variation of the steering torque, is used for the compensation control when the torque feedback control is not executed; and
a value obtained by adding a feedback gain gradient, which is a ratio of a variation of the steering reaction force component to a variation of the difference in the torque feedback control, is used for the compensation control when the torque feedback control is executed.

* * * * *

UNITED STATES PATENT AND TRADEMARK OFFICE
CERTIFICATE OF CORRECTION

| | |
|---|---|
| PATENT NO. | : 8,050,824 B2 |
| APPLICATION NO. | : 12/260472 |
| DATED | : November 1, 2011 |
| INVENTOR(S) | : Terutaka Tamaizumi et al. |

It is certified that error appears in the above-identified patent and that said Letters Patent is hereby corrected as shown below:

On the title page, Item (73), the Assignee's name is incorrect. Item (73) should read:

-- (73) Assignee: JTEKT Corporation, Osaka-shi (JP) --

Signed and Sealed this
Third Day of January, 2012

David J. Kappos
*Director of the United States Patent and Trademark Office*